No. 664,045. Patented Dec. 18, 1900.
C. HUBER.
METHOD OF SHAPING AND EMBOSSING METAL OBJECTS BY FLUID PRESSURE.
(Application filed Jan. 29, 1900.)
(No Model.)
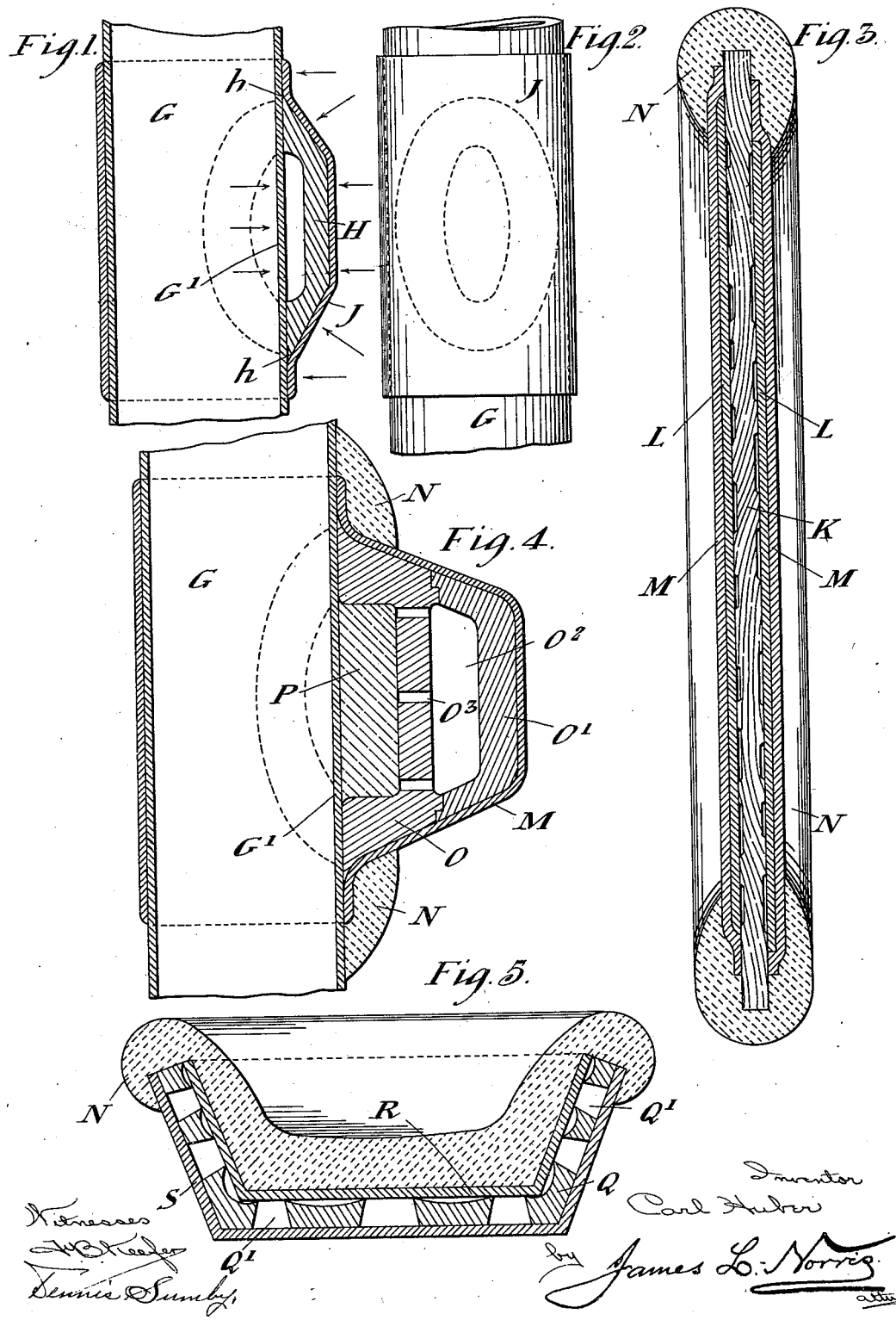

UNITED STATES PATENT OFFICE.

CARL HUBER, OF CARLSRUHE, GERMANY.

METHOD OF SHAPING AND EMBOSSING METAL OBJECTS BY FLUID-PRESSURE.

SPECIFICATION forming part of Letters Patent No. 664,045, dated December 18, 1900.

Application filed January 29, 1900. Serial No. 3,206. (No model.)

*To all whom it may concern:*

Be it known that I, CARL HUBER, a citizen of Austria, residing at 38 Beiertheimer Allee, Carlsruhe, Baden, in the Empire of Germany, have invented a certain new and useful Method of Shaping and Embossing Metal Objects by Means of Fluid-Pressure, (for which application has been made for a patent in Great Britain, dated July 3, 1899, No. 13,735,) of which the following is a specification.

This invention relates to the shaping and embossing of metal objects by fluid-pressure applied in such manner that those operations are effected without requiring molds or abutment-surfaces of such strength as to withstand the high pressure to which the metal objects require to be subjected for the above purpose. A method of operating for partly effecting the said objects was described in the specification to my Patent No. 618,353, dated January 24, 1899. According to the present improved method a strong closed chamber or receptacle charged with water or other suitable liquid and combined with means whereby such liquid can be subjected to the requisite high pressure has introduced into it the metal objects that require to be acted upon, these objects being combined with molds or abutment-surfaces in such manner that the metal objects and molds, &c., are subjected on all sides to the liquid under pressure, with the exception of those surfaces that have to be brought into close contact with each other, the liquid being prevented from penetrating between these surfaces by means of a suitable elastic or plastic packing or luting material applied around the meeting edges thereof. By this means as the pressure liquid is prevented by the packing from gaining access between the surfaces in contact the powerful pressure exerted by the liquid upon the exposed surfaces of the bodies will force the metal of these into such close contact with the mold as to cause it to assume the configuration of the latter. This method of operating can be applied to a great variety of purposes. Thus the mold may either surround the metal object when this is of a hollow or tubular form, the edges of the mold and the object at the open end or ends being inclosed by packing material, as before described, so that the liquid-pressure can only gain access to the interior of the object and the exterior of the mold, and thus in expanding the interior of the object to cause it to assume the configuration of the interior of the mold, which would be suitably divided, but which would of course not require to be made of greater strength than is required to insure its rigidity, as it is supported against the internal pressure by the corresponding external liquid-pressure. In other cases where a tubular object only requires to be shaped or embossed on part of its periphery the mold would only be made of such a size as to inclose the part of the object required to be embossed, the mold being made with a saddle-shaped face to fit accurately against the outer surface of the object and the edges thereof being covered in by packing, as before.

Figure 1 of the accompanying drawings shows a vertical section, and Fig. 2 a front view, of a tube or hollow vessel G, that requires to be bulged outward in any desired form at the part G'. For this purpose there is fitted against such part a mold H, adapted to fit closely against the tube around the part G' and having its cavity so formed as to produce the required configuration of the part G'. The edges *h* of the mold H are then inclosed hermetically either by a suitable plastic packing material, as at Fig. 1, or by inclosing the mold by a tightly-fitting caoutchouc jacket J, fitting entirely around the tube G, as shown. The tube or hollow object G, together with the mold, having then been introduced in a strong receiver and subjected to liquid-pressure applied both within the tube and against the outside of the mold, as indicated by the arrows, the part G' will be bulged outward and made to assume the form of the mold. It will be evident that the mold may be arranged to bulge the tube in the before-described manner at two or more places, or a continuous bulge may be formed all around the tube by this means by forming the mold so as to entirely surround the tube. In the case of molding a flat object by means of a flat mold the object would be laid upon the embossed ornamented or engraved face of the mold and the meeting edges be then inclosed by suitable packing, so that on being subjected to pressure the flat object would be pressed against the mold, so as to assume the configuration of its ornamented or engraved face. In this case the outer face of the object may be advantageously covered in with a sheet of caoutchouc, the edges of which would also be inclosed by the said packing, or the entire mold and object might be inclosed in a bag of caoutchouc, the opening of which would be closed by packing or by cementing together. The plate-mold in this case need not be of the thickness which is necessary when pressing by means of ordinary hydraulic or screw presses or stamps. It is sufficient if the plate be of such thickness and strength as to insure that the metal plate which is to receive the impression therefrom shall be forced into its cavities without the mold-plate being deformed in any way by the pressure on its outer side. By this means clichés can be taken from engraved or etched steel plates, or clichés may be employed as molds for producing copper, aluminium, or other engraved plates ready for printing. Also stereotype-plates for type-printing can in like manner be produced by pressure from the negative or cliché of a form, and generally any recessed or relief designs may be produced by pressure in the above-described manner from any objects or ornaments placed upon a strong plate.

Fig. 3 shows by way of example a cross-section of a mold or matrix plate K, both sides of which carry a design engraved or embossed thereon. On each such surface is laid a metal plate L and over these are laid sheets of caoutchouc M. Lastly, the meeting edges of such caoutchouc sheets, plates L, and matrix K are all covered in by a thick layer of plastic packing material N. The parts thus combined are then placed in a strong receptacle, in which they are subjected to liquid-pressure on both sides, whereby the plates L will be made to assume the configuration of the surfaces of matrix K, with which they are in contact. As before stated, instead of effecting the hermetic inclosure by the packing material N the combined parts can be introduced into a correspondingly-shaped caoutchouc bag, the opening of which is then hermetically closed in any known manner. When the cavities of the mold are of some depth, so that if the thin metal wall of the object were to be suddenly forced into them by the high pressure of the liquid medium, it might be liable to split or tear. The action may be made to take place gradually by filling the cavities of the mold with plastic material and forming on the outer surface of the latter hollow spaces communicating with the said cavities by narrow channels, so that on the application of the liquid-pressure to the object this in being forced into the cavities will gradually force the plastic material therein through the said channels into the outer spaces, and the metal object will thus only gradually assume the form of the cavities.

Fig. 4 shows a vertical section of a construction of mold such as last described. This is generally similar to that described with reference to Figs. 1 and 2, the mold O being fitted over that part of the tube G which is to be bulged. On the outer side of the mold is fitted a separate part O', with the space $O^2$, in which the interior of the mold O communicates by means of passages $O^3$. The interior of the mold having been filled with a suitable liquid, semiliquid, or plastic material P, the combined mold is placed in position on the tube G and the edges are inclosed by caoutchouc M and packing material N, and the tube, with the mold, is then placed in the pressure vessel. The pressure exerted within the tube G will gradually bulge outward the part covered by the mold in forcing the liquid or plastic material P contained in the latter through the passages $O^3$ into the space $O^2$, so that such part will only be gradually expanded to the full depth of the mold, and thus any injury to the metal by tearing or splitting will be prevented. The object may also be made to gradually assume the form of deep cavities in the mold by first subjecting it to the pressure in one or more preparatory molds of the same configuration as the final one, but in which the said cavities are of a less depth. The process may also be employed for producing openings or perforations in the object to be molded at the same time that its surface is embossed. For this purpose the mold is formed with openings or perforations extending through its walls at those points where openings are to be formed in the object, and the outer surface of the mold is inclosed by a suitable casing. When the object has been placed into or upon the mold, its outer surface, which is to be subjected to the pressure liquid, is coated with a thick layer of a suitable plastic packing material. On the combined mold and object being then subjected to liquid-pressure in a receiver the object in addition to being made to assume the configuration of the mold will have those portions which are situated over the perforations of the mold cut through by the pressure, the parts cut out being forced into the perforations of the mold, whence they are afterward removed. It will be obvious that a great variety of differently-arranged molds may be employed for carrying out the above-described invention according to the object for which they are intended and that instead of completing the molding of the object in one operation it may be subjected consecutively to the action of two or more different molds.

Fig. 5 shows a vertical section of apparatus for operating in the last-described manner. The mold Q, having the internal configuration which it is desired to impart to the object R, has openings Q', formed in it at any desired points, which openings are closed at the outer side by fitting the mold in a correspondingly-shaped outer casing S. The object R having been placed in position, the outer surface thereof, as also the meeting edges of the three parts Q R S, are covered by a thick layer of plastic packing material N, and the combined parts are then introduced into the pressure-chamber. The pressure acting on the interior of the object R will cause it to assume the configuration of the mold, and at the same time it will punch out those portions thereof that are situated over the openings Q', forcing the punched-out parts into the latter, and thus forming perforations in the object corresponding to those of the mold. The edges of the openings Q' would of course be made as sharp as possible, so as to insure a clean punching action by the liquid-pressure. On taking the mold out of its casing the cut-out portions can be removed from the holes, which are enlarged outward.

The requisite pressure may be applied to the liquid in the pressure-chamber into which the combined molds and objects are placed either by forcing in liquid at the requisite pressure by means of force-pumps or hydraulic presses or by combining with the pressure-chamber a plunger passing through an opening of the chamber and subjected to a pressure such as that of a hydraulic press, whereby, as is well known, such pressure will be transmitted uniformly throughout the body of the liquid. The said receptacles may be made of sufficient size to contain a number of objects to be submitted simultaneously to the liquid-pressure.

Having thus described the nature of this invention and the best means I know of carrying the same into practical effect, I claim—

1. In a method of shaping and embossing metal objects by molds and liquid-pressure, hermetically inclosing the contiguous or opposite surfaces of the metal object and the mold by means of plastic impervious packing material applied around the edges of such surfaces and subjecting the whole on all sides to liquid-pressure in a chamber, substantially as described.

2. In a method of shaping and embossing metal objects by molds and liquid-pressure in which a mold is fitted over that part of the object that requires to be shaped, hermetically inclosing the joint between the mold and the object by means of plastic adhesive and impervious packing material applied over the edge of the mold and subjecting the whole on all sides to liquid-pressure in a chamber, substantially as described.

3. The method of shaping and embossing metal objects by means of molds and liquid-pressure which consists in fitting a hollow mold closely over that part of the object that requires to be shaped, said mold having an outer chamber communicating by channels with its hollow, which hollow is filled with plastic material hermetically inclosing the joint between the mold and the object by means of plastic adhesive and impervious packing material applied over the edges thereof, then introducing such combined object and mold into a pressure-chamber charged with liquid-pressure medium so that such medium has access to all the outer surfaces of the body and mold, and then subjecting said medium to pressure whereby the body in being forced into the hollow of the mold gradually forces the plastic material out of the same through the said channels into the outer chamber substantially as and for the purposes described.

In testimony whereof I have hereunto set my hand in presence of two subscribing witnesses.

CARL HUBER.

Witnesses:
   JACOB ADRIAN,
   CARL BLATZ.